United States Patent [19]

Su

[11] Patent Number: 4,618,632

[45] Date of Patent: Oct. 21, 1986

[54] UV CURABLE HIGH TENSILE STRENGTH RESIN COMPOSITION

[75] Inventor: Wei-Fang A. Su, Murrysville, Pa.

[73] Assignee: Westinghouse Electric Corp., Pittsburgh, Pa.

[21] Appl. No.: 699,373

[22] Filed: Feb. 7, 1985

[51] Int. Cl.$^4$ ............................................. C08L 67/02
[52] U.S. Cl. ........................................ 522/43; 522/93; 522/44; 523/527; 525/21; 525/28
[58] Field of Search .............. 525/28, 21; 204/159.19, 204/159.14; 523/527; 522/43, 93, 44

[56] References Cited

U.S. PATENT DOCUMENTS

| | | | |
|---|---|---|---|
| 3,780,133 | 12/1973 | Kolyer | 525/28 |
| 3,891,523 | 6/1975 | Hisamatsu | 204/159.15 |
| 3,933,728 | 1/1976 | Henbest | 525/28 |
| 4,317,858 | 3/1982 | Sattler | 428/379 |
| 4,357,219 | 11/1982 | Sattler | 204/159.15 |
| 4,481,258 | 11/1984 | Sattler | 428/371 |

FOREIGN PATENT DOCUMENTS 2107334 4/1983 United Kingdom .

Primary Examiner—John C. Bleutge
Assistant Examiner—Patricia Short
Attorney, Agent, or Firm—R. D. Fuerle

[57] ABSTRACT

Disclosed is a resin composition which comprises a mixture of a polyester, an acrylate urethane, in about stoichiometric proportion with the polyester up to about 10% excess polyester over stoichiometric, and a liquid acrylate reactive diluent sufficient to give the resin composition the viscosity of less than 5,000 centipoise. The polyester resin is the reaction product of a polyhydroxy compound having at least three hydroxyl groups, and an aromatic compound that is at least difunctional in acid, anhydride, or ester groups, where the proportion of the polyhydroxy compound to the aromatic compound is such that the polyester has about 150 to about 250 mole % excess hydroxyl groups. The acrylate urethane compound is the reaction product of a hydroxy acrylate and an isocyanate having at least two isocyanate groups, where the hydroxy acrylate and a hydroxy acrylate having a single hydroxyl group are equimolar (when a diisocyanate is used) with the isocyanate ±10 mole %. Also disclosed is a method of making the resin composition.

32 Claims, No Drawings

UV CURABLE HIGH TENSILE STRENGTH RESIN COMPOSITION

BACKGROUND OF THE INVENTION

Amorphous metal strip continuously wound into toroidal cores for use in distribution transformers dramatically reduces the magnetic loss compared to orientated steel coils. However, the amorphous metal strip wound cores are very fragile and are not self-supporting, so an external support system is required to protect the cores against mechanical forces during handling, winding, and assembly operations. This can be accomplished by coating or encapsulating the cores with a suitable resin. Resins for use in this application must have a very high tensile strength. It is also desirable that they cure rapidly without the evolution of polluting solvents.

SUMMARY OF THE INVENTION

We have discovered a high tensile strength UV curable resin composition which is ideally suited for use in coating and encapsulating amorphous metal strip cores. The resin compositions of this invention, without the addition of any filler, have tensile strengths as high as 7200 psi at room temperature and 850 psi at 100° C. When a filler is added, of course, the tensile strength of the resulting filled resin is increased. In addition, the filled resin compositions of this invention exhibit extremely good dimensional stability, typically only 7% elongation at room temperature and 9% elongation at 100° C.

Other advantages of the resin compositions of this invention are that they can be cured very fast, usually in only a few seconds, without the evolution of any solvent. Moreover, coatings as thick as 20 mils or more can be formed from these resin compositions.

DESCRIPTION OF THE INVENTION

In the first step of the process of this invention, a polyester is prepared by reacting a polyhydroxy compound with an aromatic di- or polyfunctional acid, anhydride, or ester. The polyhydroxy compound is a compound that contains three or more hydroxyl groups, such as trimethylol propane, tris (2-hydroxyethyl) isocyanurate (THEIC), tris (2-hydroxyethyl) cyanurate, glycerol, trimethylol ethane, pentaerythritol, trimethylol propane, or erythritol. The preferred polyhydroxy compound is THEIC as that gives a better tensile strength and toughness.

The aromatic di- or polyfunctional acid, anhydride, or ester is an aromatic compound that has two or more acid, anhydride, or ester groups, or mixtures of these groups. Difunctional compounds are preferred as there is less chance of a resin composition gelling with a difunctional compound. Esters are preferred for a smoother reaction, but compounds having acid groups are less expensive. Suitable compounds include terephthalic acid, isophthalic cid, trimellitic acid, trimellitic anhydride 3,3′,4,4′-benzophenone tetracarboxylic dianhydride, pyromellitic dianhydride, polyazelaic polyanhydride, pyromellitic tetracarboxylic acid, 3,3′,4,4′-benzophenone tetracarboxylic acid, and alkyl (methyl, ethyl, propyl, etc.) esters of these acids. The preferred aromatic compound is terephthalic acid as it gives better tensile strength.

The polyester reaction product of the polyhydroxy compound and the aromatic compound must have excess hydroxy groups in order to react with the acrylate urethane compound, which is also part of the resin composition. If insufficient hydroxyl groups are present on the polyester, the resin product will have poor tensile strength, and if too many hydroxyl groups are present on the polyester, the resin product will have poor shelf life. If less than 150 mole % excess hydroxyl groups are present, cure is slow, and if more than 250 mole % excess hydroxyl groups are present, unreactive polyhydroxy compound will be present and toughness and tensile strength will be lower. If about 200 mole % excess hydroxyl groups are present on the polyester, the resin product will have the maximum tensile strength. The proportions of polyhydroxy compound to aromatic compound are adjusted to give a mole % of excess hydroxyl groups within this range. The reaction of the polyhydroxy compound with the aromatic compound proceeds without the presence of a solvent, but a suitable amount (about 0.05 to about 0.50 parts per 100 parts resin (phr)) of an esterification catalyst is needed. Any esterification catalyst, such as dibutyl tin oxide, tetraisopropyl titanate, dihydroxy butyl tin chloride, triphenyl tin chloride, or triphenyl tin acetate can be used. Dibutyl tin oxide is preferred as it is an inexpensive, readily available, and works well. The composition of the polyhydroxy compound and the aromatic compound is mixed thoroughly and is heated in 15° C. increments over about a one hour period to a temperature of about 210° to about 250° C., or until no further condensate is emitted.

The reaction of the polyhydroxy compound with the aromatic compound produces an ester oligomer having excess hydroxyl groups:

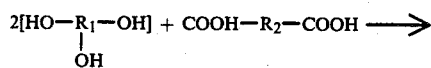

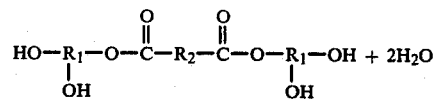

In the next step in the process of this invention, an acrylate urethane is produced by the reaction of a hydroxy acrylate with an isocyanate. The hydroxy acrylate is a compound having at least one hydroxyl group and at least one acrylate group. Preferably, the hydroxy acrylate includes only a single hydroxyl group because polyhydroxy groups will form a high molecular weight polymer with isocyanate instead of the adduct of hydroxyethyl acrylate and isocyanate. Also, the hydroxy acrylate preferably includes only a single acrylate group because the polyacrylate group will increase the undesired properties such as brittleness and high shrinkage. Suitable hydroxy acrylates include hydroxyethyl acrylate, hydroxyethyl-β-carboxyethyl acrylate, and 3-hydroxyethyl acrylate. Hydroxyethyl acrylate is preferred as it is readily available and produces a tougher product. Aromatic hydroxy acrylates are preferred for thermal stability and toughness; however, they are not commercially available at this time.

The isocyanate compound used in preparing the acrylate urethane must have two or more isocyanate groups. Preferably, the isocyanate compound is an aromatic compound as they produce tougher resin products. Suitable isocyanate compounds include meta-phenylene diisocyanate, toluylene diisocyanate, hexamethylene diisocyanate, metaxylyene diisocyanate, 4,4'-diisocyanato diphenyl sulfone, 4,4'-diisocyanato diphenyl ether, and 4,4'-diisocyanato diphenyl methane. The preferred isocyanate is toluylene diisocyanate as it is readily available and gives a tougher product.

In reacting the hydroxy acrylate compound with the isocyanate compound, equimolar (if a diisocyanate and a hydroxy acrylate having a single hydroxyl group are used) amounts are used, though either component may be present in up to about 10 mole % excess of equimolar (if a diisocyanate and a hydroxy acrylate having a single hydroxyl group are used). No solvent or catalyst is required. The mixture of the hydroxy acrylate and the isocyanate compound reacts exothermically and is preferably cooled to under 70° C. during the reaction because a higher reaction temperature will give a premature gellation. After about one hour the reaction is usually complete. The reaction of hydroxy acrylate with the isocyanate compound produces an acrylate urethane, containing one urethane group and one nonreacted isocyanate group.

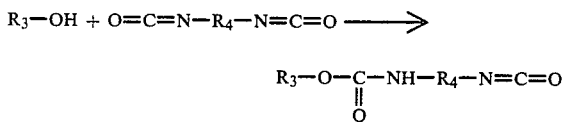

In the next step of the process of this invention, the polyester is reacted with the acrylate urethane. These two components are reacted, stoichiometrically, although up to about 10 mole % excess polyester may be present. Excess acrylate urethane, however, should not be present as it is toxic in the product. A stoichiometric reaction would typically mean that about 4 moles of acrylate urethane are present for each mole of polyester that is present. While no solvent is required for this reaction, it is necessary to include a reactive diluent to solubilize the polyester and the acrylate urethane. Unlike a solvent, a reactive diluent is reacted into the resin product and is not volatilized during resin cure. The reactive diluent is a liquid acrylate which has a viscosity of less than 1,000 centipoises (cps). The acrylate preferably has two or more acrylate groups as this gives greater tensile strength in the product. Suitable examples of acrylates which can be used as reactive diluents include tetraethylene glycol diacrylate, 1,3-butylene glycol diacrylate, 1,4-butanediol diacrylate, diethyleneglycol diacrylate, 1,6-hexanediol diacrylate and neopentyl glycol diacrylate. The preferred reactive diluent is tetraethylene glycol diacrylate because it has a low viscosity and gives a high tensile strength to the product. Sufficient reactive diluent should be used so that the resin composition has a viscosity of less than 5,000 cps. If the resin composition viscosity is greater, the resin composition will not flow readily and will not fill all of the interstices of the substrate. Typically, this means that the reactive diluent constitutes about 20 to about 60% by weight of the total weight of the resin composition.

If the resin composition is not to be used soon after it is prepared, it is desirable to include about 0.005 to about 0.05% by weight (based on total resin composition weight) of an inhibitor to add to its shelf life. If less inhibitor is used the resin composition may start to gel during storage, and if more is used it may be difficult to gel the composition when it is used. Suitable inhibitors include benzoquinone, methyl-p-benzoquinone, hydroquinone, hydroquinone monoethyl ether, and 2,3,5,6-tetrachlorobenzoquinone. The preferred inhibitor is benzoquinone because it is readily available and it works well.

A photoinitiator sensitive to ultraviolet (UV) light is required to cure the composition, but the photoinitiator need not be added to the composition until it is ready to be used. Particularly stable photoinitiators can, however, be mixed into the resin composition when it is stored. Examples of suitable photoinitiators include isopropyl benzoin ether, diethoxy phenyl acetophenone, 2,2-dimethoxy-2-phenyl acetophenone, isobutyl benzoin ether, and 2-hydroxy-2-methyl-1-phenyl-propan-1-one. The preferred photoinitiator is isobutyl benzoin ether because it is inexpensive, it is in easily applied liquid form, and has been found to work very well. Isobutyl benzoin ether is normally not added to the resin composition until the composition is to be applied and cured. Typically about 1 to about 5 phr of the photoinitiator is satisfactory.

The tensile strength of the cured resin composition can be further increased by the addition of up to about 50% by weight (based on total composition weight) of a filler. The filler should be transparent to ultraviolet light so that it does not absorb the ultraviolet light and prevent the resin composition from curing. Suitable filler include fibers, roving, mat, or cloth of glass, polyethylene terephthalate, mica, quartz, silica, talc, calcium carbonate, and boron. The preferred filler is glass cloth as it has a very high tensile strength and has been found to work well.

When it is desired to use the resin composition, it is applied to a surface and is exposed to ultraviolet light. Any type of ultraviolet light is effective and a complete cure will normally occur in only a few seconds by a free radical curing mechanism.

The resin compositions of this invention are primarily intended for use in bonding amorphous metal cores. In that application, a primer resin is first applied to the core to insure good adhesion of the resin composition to the core. After the primer composition is applied, a filler is pressed into the primer coating, then the primer coating is cured. An example of a suitable primer composition can be found in U.S. Pat. No. 4,481,258, which discloses an acrylated epoxy resin, herein incorporated by reference. The resin composition of this invention is then applied over the primer coating, filler is pressed into the resin coating, and the resin coating is cured with UV light. Any number of layers of the resin coating and filler can be applied to build up the total thickness of the coating. It is preferable to post bake the coatings after UV curing to insure that the resin compositions have been completely cured. This can be accomplished by heating for 2 to 5 hours at about 100° to 150° C.

The resin compositions of this invention can also be used as adhesives, encapsulants, or as coatings in other applications.

The following example further illustrates this invention.

EXAMPLE

A polyester resin was made in a three liter four-neck reaction flask equipped with stirrer, thermometer, nitrogen sparge, and downward distillation column. The flask was charged with 218.6 grams of tris (2-hydroxyethyl) isocyanurate, 69.8 grams of terephthalic acid, and 3.5 grams of deionized water. The reaction mixture was heated to 140° C., and 0.8 grams of dibutyl tin oxide was added. The mixture was then reacted at 210° to 250° C. in 15° C. increments per hour until 17 ml of water was collected. The temperature was reduced to 120° C. and the resin was cut with 517 grams tetraethylene glycol diacrylate (TEGDA).

An acrylate urethane was prepared in a one liter four-neck reaction flask equipped with stirrer, thermometer, nitrogen sparge, and water bath for cooling. The flask was charged with 194.4 grams 2-hydroxyethyl acrylate and 0.1 grams benzoquinone. To the mixture was gradually added 291.6 grams toluylene diisocyanate and the reaction mixture was kept cooled to a temperature just below 60° C. After all the toluylene diisocyanate was added, the mixture was reacted at 60° to 70° C. for one hour. The acrylate urethane was poured under nitrogen into an air-tight tared container.

A resin composition was prepared by mixing 486 grams of the acrylate urethane with the entire amount of the polyester resin described above. The mixture was reacted 120° C. for one hour and was cut with 621.0 grams TEGDA, then poured into a tared container. The viscosity of the resin composition was in the range of 3,000 to 5,000 cps at 25° C. The resin was sensitized by the addition of 4 phr isobutyl benzoin ether sold by Stauffer Chemical Company under a trade designation "V-10." This composition is identified as composition A.

Identical compositions B, C, and D were prepared in the same manner except that the 60% TEGDA was replaced with 26.7% phenoxyethyl acrylate (PEA) and 33.3% TEGDA, or 60% PEA, or 26.7% TEGDA and 33.3% trimethyl propane triacrylate (TMPTA), respectively.

Transformer oil compatibility tests (ASTMD-3455-78) were carried out using pieces of amorphous metal strip 2 inches wide by 5 inches long by 0.005 inches thick. The specimens were coated with a primer composition which consisted of 56.70% (by weight) acrylated epoxy, 6.45% acrylated urethane, 24.10% phenoxy ethyl acrylate, 7.98% tetra ethylene glycol diacrylate and 3.85% isobutyl benzoin ether. A fiberglass cloth 4 inches by 12 inches was pressed into the primer composition coating and it was cured with UV light. Compositions A, B, C, and D were then coated onto other specimens, a similar glass cloth was pressed into these coatings, and they were cured with UV light. The specimens were all post baked for four hours at 150° C. The results of the ASTM test indicated that the cured resin compositions do not contaminate transformer oil.

A 25 pound rectangular amorphous metal coil was encapsulated in the same manner and was then thermally cycled between −35° C. and 110° C., nine times in air and nine times in transformer oil. The coating showed no visible damage after the cycling.

In other tests, coatings of the resins were applied to the mold of tensile test specimens (ASTM 0638-77a) until a layer 13 mils thick was obtained. Some of the coatings were post baked for four hours at 130° C. and some were not. The coatings were then tested for tensile strength and elongation at room temperature and at 100° C. The following table gives the results.

| Composition | No. of Layers to Obtain 13 mil. Thick. | Post Baking 4 hrs, 130° C. | Test At Room Temp. TSB (psi) | EB (%) | Test At 100° C. TSB (psi) | EB (%) | Comments |
| --- | --- | --- | --- | --- | --- | --- | --- |
| A | 1 | No | 7200 | 7 | 850 | 9 | Excellent tensile strength |
|   | 1 | Yes | — | — | 900 | 7 | properties and dimensional stability. |
| B | 1 | No | 10000 | 5 | 323 | 7 | The tensile strength of this |
|   | 1 | Yes | — | — | 450 | 9 | material at 100° C. was not good enough. |
| C | 3 | No | 6346 | 9 | — | — | The tensile strength of this |
|   | 6 to 7 | No | 4835 | 3 | 107 | 7 | material at 100° C. was low. |
|   | 6 to 7 | Yes | — | — | 128 | 9 |   |
| D | 1 | Yes | — | — | 1400 | — | This material has too much shrinkage after curing. |
| Primer | 4 | No | 1159 | 25 | 22 | 13 | The tensile strength of this material at 100° C. was too low. |
|   | 4 | Yes | 2250 | 33 | 87 | 23 | The cure rate was slow. |

TSB = Tensile Strength at Break.
EB = Elongation at Break.

The above table shows that the compositions that contained tetraethylene glycol diacrylate had superior tensile strength compared to the compositions that instead contained a monofunctional acrylate. Composition D, while it had high tensile strength, shrunk a great deal after curing. This may adversely affect the magnetic properties of a metal substrate, and may make it unsuitable for use in coating magnetic cores.

I claim:

1. A resin composition containing no non-reactive solvent comprising
    (A) a polyester that comprises the reaction product of
        (1) polyhydroxy compound having at least three hydroxyl groups, and
        (2) aromatic compound that is at least difunctional in a group selected from acid, anhydride, ester, and mixtures thereof, where the proportion of said polyhydroxy compound to said aromatic compound is selected so that said polyester has about 150 to about 250 mole % excess hydroxyl groups;
    (B) an acrylate urethane in about stoichiometric proportion with said polyester up to about 10% excess polyester over stoichiometric, where said acrylate urethane comprises the reaction product of
        (1) hydroxy acrylate having a single hydroxyl group; and
        (2) diisocyanate, said hydroxy acrylate being equimolar ±10 mole % with said diisocyanate; and
    (C) liquid acrylate reactive diluent sufficient to give said resin composition a viscosity of less than 5000 cps.

2. A composition according to claim 1 which includes about 0.005 to about 0.5% by weight of an inhibitor.

3. A composition according to claim 2 wherein said inhibitor is benzoquinone.

4. A composition according to claim 1 wherein said polyhydroxy compound is tris(2-hydroxyethyl)isocyanate.

5. A composition according to claim 1 wherein said aromatic compound is difunctional.

6. A composition according to claim 5 wherein said aromatic compound is terephthalic acid.

7. A composition according to claim 1 wherein said aromatic compound has ester functionality.

8. A composition according to claim 1 wherein said hydroxy acrylate is hydroxyethyl acrylate.

9. A composition according to claim 1 wherein said isocyanate is aromatic.

10. A composition according to claim 9 wherein said isocyanate is toluylene diisocyanate.

11. A composition according to claim 1 wherein the amount of said reactive diluent is about 20 to about 60% by weight, based on total composition weight.

12. A composition according to claim 1 wherein said reactive diluent has at least two acrylate groups.

13. A composition according to claim 1 wherein said reactive diluent has a viscosity of less than 1000 cps.

14. A composition according to claim 13 wherein said reactive diluent is tetraethylene glycol diacrylate.

15. A composition according to claim 1 which includes up to about 50% by weight, based on total composition weight of a filler that is transparent to UV light.

16. A composition according to claim 15 wherein said filler is glass.

17. A composition according to claim 1 which includes about 1 to about 5 phr of a UV photoinitiator.

18. A composition according to claim 17 wherein said photoinitiator is isobutyl benzoin ether.

19. A coating comprising a cured composition according to claim 17.

20. A composition containing no non-reactive solvent comprising
(A) a polyester that comprises the reaction product of
 (1) tris(2-hydroxy ethyl)isocyanurate; and
 (2) an aromatic compound that is difunctional in a group selected from acid, anhydride, ester, and mixtures thereof, where the proportion of said polyhydroxy compound to said aromatic compound is selected so that said polyester has about 150 to about 250 mole % excess hydroxyl groups;
(B) an acrylate urethane in about stoichiometric proportion with said polyester up to about 10% excess polyester over stoichiometric, where said acrylate urethane comprises the reaction product of
 (1) hydroxy acrylate having a single hydroxyl group and a single acrylate group; and
 (2) an aromatic diisocyanate, said hydroxy acrylate being equimolar ±10 mole % with said isocyanate;
(C) about 20 to about 60% by weight, based on total composition weight, of a liquid acrylate reactive diluent having at least two acrylate groups and a viscosity of less than 1000 cps;
(D) about 0.005 to about 0.5% by weight of an inhibitor;
(E) about 1 to about 5 phr of a UV photoinitiator; and
(F) up to about 50% by weight, based on total composition weight, of a filler that is transparent to UV light.

21. A method of making a resin composition containing no non-reactive solvent comprising
(1) preparing a first composition which comprises
 (a) polyhydroxy compound having at least three hydroxyl groups;
 (b) aromatic compound that is at least difunctional in a group selected from acid, anhydride, ester, and mixtures thereof, where the proportion of said polyhydroxy compound to said aromatic compound is selected so that the hydroxyl functionality is abut 150 to about 250 mole % in excess of stoichiometric; and
 (c) sufficient amount of an esterification catalyst;
(2) heating said first composition to produce a polyester;
(3) preparing a second composition which comprises
 (a) a hydroxy acrylate having a single hydroxyl group; and
 (b) diisocyanate, said hydroxy acrylate being equimolar ±10 mole % with said diisocyanate;
(4) allowing said second composition to exotherm to produce an acrylate urethane;
(5) preparing a resin composition which comprises
 (a) said polyester;
 (b) said acrylate urethane in an amount from about stoichiometric with said polyester to about 10% excess of said polyester over stoichiometric;
 (c) liquid acrylate reactive diluent sufficient to give said resin composition a viscosity of less than 5000 cps.

22. A transformer coil coated with a resin composition containing no non-reactive solvent which comprises:
(A) a polyester that comprises the reaction product of
 (1) polyhydroxy compound having at least three hydroxyl groups, and
 (2) aromatic compound that is at least difunctional in a group selected from acid, anhydride, ester, and mixtures thereof, where the proportion of said polyhydroxy compound to said aromatic compound is selected so that said polyester has about 150 to about 250 mole % excess hydroxyl groups;
(B) an acrylate urethane in about stoichiometric proportion with said polyester up to about 10% excess polyester over stoichiometric, where said acrylate urethane comprises the reaction product of
 (1) hydroxy acrylate having a single hydroxyl group; and
 (2) diisocyanate, said hydroxy acrylate being equimolar ±10 mole % with said diisocyanate; and
(C) liquid acrylate reactive diluent sufficient to give said resin composition a viscosity of less than 5000 cps.

23. A composition according to claim 1 wherein said polyester has about 200 mole % excess hydroxyl groups.

24. A composition according to claim 1 wherein said hydroxy acrylate is selected from the group consisting of hydroxyethyl acrylate, hydroxyethyl-β-carboxyethyl acrylate, 3-hydroxyethyl acrylate, and mixtures thereof.

25. A composition according to claim 1 wherein said isocyanate is selected from the group consisting of metaphenylene diisocyanate, toluylene diisocyanate, hexamethylene diisocyanate, meta-xylene diisocyanate, 4,4'-diisocyanato diphenyl sulfone, 4,4'-diisocyanato diphenyl ether, 4,4'-diisocyanato diphenyl methane, and mixtures thereof.

26. A composition according to claim 1 wherein said polyhydroxy compound is selected from the group consisting of trimethylol propane, tris(2-hydroxyethyl)isocyanurate, tris(2-hydroxyethyl)cyanurate, glycerol, trimethylol ethane, pentaerythriol, trimethylol propane, erythritol, and mixtures thereof.

27. A composition according to claim 1 wherein said aromatic compound is selected from the group consisting of terephthalic acid, isophthalic acid, trimellitic acid, trimellitic anhydride, 3,3',4,4'-benzophenone tetracarboxylic dianhydride, pyromellitic dianhydride, polyazelaic polyanhydride, pyromellitic tetracarboxylic acid, 3,3',4,4'-benzophenone tetracarboxylic acid, and esters and mixtures thereof.

28. A composition according to claim 1 wherein said reactive diluent is selected from the group consisting of tetraethylene glycol diacrylate, 1,3-butylene glycol diacrylate, 1,4-butanediol diacrylate, diethyleneglycol diacrylate, 1,6-hexanediol diacrylate, neopentyl glycol diacrylate, and mixtures thereof.

29. A composition according to claim 2 wherein said inhibitor is selected from the group consisting of benzoquinone, methyl-p-benzoquinone, hydroquinone, hydroquinone monoethyl ether, 2,3,5,6-tetrachlorobenzoquinone, and mixtures thereof.

30. A composition according to claim 17 wherein said photoinitiator is selected from the group consisting of isopropyl benzoin ether, diethoxy phenyl acetophenone, 2,2-dimethoxy-2-phenyl acetophenone, isobutyl benzoin ether, 2-hydroxy-2-methyl-1-phenyl-1-propan-1-one, and mixtures thereof.

31. A resin made from a composition according to claim 1, having the structure $$[[HA-I]_p PH]_q A$$

where PH is the residue of said polyhydroxy compound, A is the residue of said aromatic compound, HA is the residue of said hydroxy acrylate, where said hydroxy acrylate has a single hydroxyl group, I is the residue of said isocyanate, where said isocyanate is a diisocyanate, p is one less than the number of hydroxyl groups on said polyhydroxy compound, and q is the functionality of said aromatic compound.

32. A resin according to claim 31 wherein said hydroxy acrylate is hydroxyethyl acrylate, said isocyanate is toluylene diisocyanate, said polyhydroxy compound is tris(2-hydroxyethyl)isocyanurate, and said aromatic compound is terephthalic acid.

* * * * *